(12) United States Patent
Kwon et al.

(10) Patent No.: US 9,228,038 B2
(45) Date of Patent: Jan. 5, 2016

(54) ETHYLENE COPOLYMER WITH IMPROVED HYGIENIC PROPERTY AND PROCESS FOR PREPARING THE SAME

(71) Applicant: SK INNOVATION CO., LTD., Seoul (KR)

(72) Inventors: Seung Bum Kwon, Seoul (KR); Se Won Oh, Seoul (KR); Hyeong Taek Ham, Daejeon (KR); Choon Sik Shim, Daejeon (KR); Sung Seok Chae, Daejeon (KR); Dae Ho Shin, Daejeon (KR)

(73) Assignee: SABIC SK NEXLENE COMPANY PTE. LTD., Singapore (SG)

( * ) Notice: Subject to any disclaimer, the term of this patent is extended or adjusted under 35 U.S.C. 154(b) by 0 days.

(21) Appl. No.: 13/922,527

(22) Filed: Jun. 20, 2013

(65) Prior Publication Data

US 2013/0280461 A1 Oct. 24, 2013

Related U.S. Application Data

(63) Continuation-in-part of application No. 13/227,850, filed on Sep. 8, 2011, now abandoned.

(30) Foreign Application Priority Data

Sep. 20, 2010 (KR) .................. 10-2010-0092366

(51) Int. Cl.
| | | |
|---|---|---|
| *C08F 210/16* | (2006.01) | |
| *C08F 4/6592* | (2006.01) | |
| *B32B 27/32* | (2006.01) | |
| *C08F 10/00* | (2006.01) | |
| *C08F 210/10* | (2006.01) | |
| *C08F 4/659* | (2006.01) | |

(52) U.S. Cl.
CPC .............. *C08F 210/16* (2013.01); *C08F 10/00* (2013.01); *C08F 4/65908* (2013.01); *C08F 4/65912* (2013.01); *C08F 210/10* (2013.01); *Y10T 428/139* (2015.01); *Y10T 428/1352* (2015.01)

(58) Field of Classification Search
CPC .............. C08F 210/16; C08F 4/65908; C08F 4/65912; Y10T 428/139; Y10T 428/1352
USPC .................. 526/348, 133, 134, 160, 161
See application file for complete search history.

(56) References Cited

U.S. PATENT DOCUMENTS

| | | | |
|---|---|---|---|
| 5,198,401 A | 3/1993 | Turner et al. | |
| 7,569,651 B2 * | 8/2009 | Schottek et al. | 526/348 |
| 7,592,403 B2 * | 9/2009 | Kashiwa et al. | 526/160 |
| 8,334,354 B2 * | 12/2012 | Kwon et al. | 526/348 |
| 2010/0120981 A1 | 5/2010 | Shin et al. | |

FOREIGN PATENT DOCUMENTS

| | | |
|---|---|---|
| CA | 2729585 | 3/2010 |
| JP | 2004503623 | 2/2004 |
| JP | 2004136977 | 5/2004 |
| WO | 2008002379 | 1/2008 |
| WO | 2009084805 | 7/2009 |
| WO | 2010030145 | 3/2010 |

OTHER PUBLICATIONS

B. Monrabal et al., Characterization of polypropylene-polyethylene blends by temperature rising elution and crystallization analysis fractionation, Anal Bioanal Chem, 2011, pp. 1557-1561.
W. W. Yau et al., New approaches using MW-sensitive detectors in GPC-TREF for polyolefin characterization, Polymer, 2001, pp. 8947-8958.
European Search Report—European Application No. 11826988.5 issued on May 27, 2014, citing CA 2 729 585.

* cited by examiner

*Primary Examiner* — Caixia Lu
(74) *Attorney, Agent, or Firm* — Cantor Colburn LLP

(57) ABSTRACT

Provided is an ethylene copolymer having improved hygienic property. More particularly, the ethylene copolymer satisfies a correlation between a density thereof and an extract content. The ethylene copolymer having improved hygienic property can be applied in injection molding, rotation molding, or blow molding.

11 Claims, 2 Drawing Sheets

FIG. 1

ETHYLENE COPOLYMER WITH IMPROVED HYGIENIC PROPERTY AND PROCESS FOR PREPARING THE SAME

TECHNICAL FIELD

Described herein is an ethylene copolymer and a process for preparing the same, and more particularly an ethylene copolymer exhibiting a correlation between an improvement in hygienic property and a change of density, which is inherent property of a product, a process for preparing the same, and an application thereof.

BACKGROUND OF THE INVENTION

A polyethylene resin has mechanical and thermal properties affected by a molecular weight and a density thereof, which causes the application of the polyethylene resin to be varied. In general, the lower the density of the polyethylene resin, the better the transparency and low-temperature impact resistance, but the worse the physical properties, such as heat resistance, hardness and flexural modulus, and the higher an extract content.

Whereas, the higher the density of the polyethylene resin, the better the physical properties, such as heat resistance, hardness and flexural modulus and the lower the extract content, but the worse the transparency and low-temperature impact resistance. For this reason, when an injection product using an ethylene copolymer, particularly a refrigerating container, a food container, or the like, is manufactured, an injection product having high hygienic property and excellent low-temperature impact rigidity is remarkably difficult to manufacture. In particular, since the injection product such as a refrigerating container, a food container, or the like is highly required to have high hygienic property and excellent low-temperature impact rigidity, the necessity for these techniques is expected to be more increased.

SUMMARY OF THE INVENTION

An object of the present invention is to provide an ethylene copolymer for an food injection container having high rigidity, excellent impact resistance, and superior hygienic property, and a process for preparing the same.

Another object of the present invention is to provide an ethylene copolymer exhibiting a correlation between density and extract content, so that an ethylene copolymer having a low extract content and excellent hygienic property can be prepared, to provide a process for preparing the same, and an application thereof. The reason is that the melt index (MI) and the density of the resin are important factors which control the processing condition.

In one embodiment, the present invention provides an injection-moldable ethylene copolymer obtained by polymerization of ethylene and (C3-C18) α-olefin comonomer, wherein the ethylene copolymer has a density of 0.900 to 0.960 g/cm$^3$ and a melt index (MI) of 3 to 50 g/10 min and is represented by Formulas 1 and 2 below.

$$S \geq (8 \times 10^{56}) \times e^{-144.1D} \quad \text{[Formula 1]}$$

$$S \leq (3 \times 10^{25}) \times e^{-61.8D} \quad \text{[Formula 2]}$$

wherein in Formulas 1 and 2, S represents the extract content of the ethylene copolymer and D represents the density of the ethylene copolymer.

The extract content of the ethylene copolymer, represented by S in Formulas 1 and 2, can be analyzed using temperature rising elution fractionation (TREF) analysis methods, where the extract content (S) is the fraction (e.g. percentage) of the peak elution fraction eluted at 35° C. for 10 minutes based on the total crystallization peak. The solvent used in the TREF analysis method for measuring the amount of extracts can include o-dichlorobenzene, perchloroethylene, a-chloronaphthalene, or 1,2,4-trichlorobenzene. Specifically, the solvent is 1,2,4-trichlorobenzene.

In various embodiments, an ethylene copolymer is obtained by polymerization of ethylene and (C3-C18) α-olefin co-monomer, the ethylene copolymer being injection-moldable, wherein the ethylene copolymer has a density of 0.91 to 0.94 g/cm$^3$ and a melt index (MI) of 3 to 50 g/10 min, and satisfies Formulas 1 and 2 below:

$$S \geq (8 \times 10^{56}) \times e^{-144.1D} \quad \text{[Formula 1]}$$

$$S \leq (3 \times 10^{25}) \times e^{-61.8D} \quad \text{[Formula 2]}$$

wherein in Formulas 1 and 2, S represents an extract content of the ethylene copolymer at 35° C. after 10 minutes as measured by temperature rising elution fractionation analysis using 1,2,4-trichlorobenzene as a solvent, and D represents a density of the ethylene copolymer.

Hereinafter, the present invention will be described in more detail.

Unless indicated otherwise, it is to be understood that all the terms used in the specification including technical and scientific terms has the same meaning as those that are understood by those skilled in the art, and further, in the description below, well-known functions or constructions will not be described in detail since they may unnecessarily obscure the understanding of the present invention.

The present invention provides an ethylene copolymer for an injection food container, having a low extract content and excellent hygienic properties, a process for preparing the same, and an application thereof.

Formulas 1 and 2 above express a correlation between the extract content (S) and the density (D) of the ethylene copolymer.

The ethylene copolymer can have little or no extract content, or an extract content of 1.8 wt % or lower, based on measurement of elution fraction. More specifically, the ethylene copolymer has an extract content of 0.1 to 1.8 wt %. The elution fraction can be determined from data obtained by temperature rising elution fractionation analysis. The elution fraction is determined to be a fraction (percentage) of the peak elution fraction eluted at 35° C. for 10 minutes based on the total crystallization peak. It is desirable that the amount of material extracted and remaining after copolymerization of ethylene be 1.8 wt % or lower, because the extracted material (i.e. the non-polymerized material remaining after copolymerization of ethylene) causes the physical properties of the prepared ethylene copolymer to be deteriorated The present invention provides an ethylene copolymer obtained by polymerization of ethylene and (C3-C18) α-olefin comonomer. The (C3-C18) α-olefin comonomer may be selected from propylene, 1-butene, 1-pentene, 4-methyl-1-pentene, 1-hexene, 1-octene, 1-decene, 1-dodecene, and a mixture thereof. The α-olefin comonomer is used to impart fluidity to ethylene homopolymer and prepare a high-molecular weight ethylene copolymer, thereby functioning to improve mechanical properties including impact resistance. The α-olefin comonomer may be used in a content of 1 to 40 wt %, preferably 1 to 30 wt %, and more preferably 1 to 20 wt %. If the content of the α-olefin comonomer is below 1 wt %, rigidity of the ethylene polymer is increased but impact resistance thereof is reduced, and thus the α-olefin comonomer is difficult to use in a film, injection, compound, a sheet, blow molding, or the like, which requires impact resistance. If the content of the α-olefin comonomer is above 40 wt %, impact resistance of the ethylene polymer is increased, but rigidity thereof is reduced, and thus, the α-olefin comonomer is difficult to be exclusively used in molded products, such as pipes, blow molded products, rotation molded products, sheet products, compound products, or the like.

In addition, the present invention provides an ethylene copolymer having a density (D) of 0.900 to 0.960 g/cm³, preferably 0.905 to 0.950 g/cm³, and more specifically 0.910 to 0.940 g/cm³. The density is measured by ASTM D 1505, and a factor that determines mechanical properties of the ethylene copolymer including impact resistance. The ethylene copolymer having a density of the above range is useful for application to pipes, hollow molded products, rotation molded products, sheet products, compound products, or the like, particularly to food containers and refrigerating containers, which require impact resistance.

Furthermore, the present invention provides an ethylene copolymer satisfying Formula 3 below while satisfying Formula 1 above.

$$S \geq (8 \times 10^{56}) \times e^{-144.1D}$$ [Formula 1]

$$S \leq (7 \times 10^{32}) \times e^{-81.1D}$$ [Formula 3]

In Formulas 1 and 3, S represents the extract content of the ethylene copolymer and D represents the density of the ethylene copolymer.

In addition, the present invention provides an ethylene copolymer having a melt index (MI) of 3 to 50 g/10 min. The melt index is measured by ASTM D 1238. The melt index is very important since the melt characteristic of the resin is directly related to the processability of a product and influences the physical properties of the product or its appearance. The melt index is a measure of the weight of a resin flowing through a capillary tube under a predetermined load and a predetermined temperature for 10 minutes, which is most influenced by a molecular weight and a molecular weight distribution.

In the present invention, the ethylene copolymer having a melt index of the above range is useful for application to pipes, hollow molded products, rotation molded products, sheet products, compound products, or the like, particularly to food containers and refrigerating containers, which require rigidity, uniform stress resistance, and superior processability.

Hereinafter, examples of the process for preparing the ethylene copolymer of the present invention will be described, but the present invention is not limited to the following processes.

As a catalyst used in the present invention, a transition metal catalyst of Chemical Formula 1 below and a co-catalyst composition including at least one of Chemical Formulas 2 to 4 and at least one of Chemical Formulas 5 to 9 may be used.

Chemical Formula 1 represents a group IV transition metal catalyst, which comprises at least one aryloxide ligand substituted with a cyclopentadiene derivative around a transition metal and aryl derivatives at the ortho-positions, the ligands not being crosslinked with each other.

[Chemical Formula 1]

In Chemical Formula 1,

M represents a group IV transition metal as classified in the periodic table;

Cp is a cyclopentadienyl ring or a fused ring including a cyclopentadienyl ring, which may be η5-bonded to the central metal M, and the cyclopentadienyl ring or the fused ring including a cyclopentadienyl ring may be further substituted with one or more selected from (C1-C20)alkyl, (C6-C30)aryl, (C2-C20)alkenyl, and (C6-C30)ar(C1-C20)alkyl;

$R^1$ through $R^4$ independently represent a hydrogen atom, a halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, or nitro, or the $R^1$ through $R^4$ are linked to an adjacent substituent via (C3-C12)alkylene or (C3-C12)alkenylene with or without a fused ring to form an alicyclic ring and a monocyclic or polycyclic aromatic ring;

$Ar^1$ represents (C6-C30)aryl or (C3-C30)heteroaryl containing one or more selected from N, O, and S;

$X^1$ and $X^2$ independently represent a halogen atom, (C1-C20)alkyl, (C3-C20)cycloalkyl, (C6-C30)ar(C1-C20)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, or $R^1$ through $R^{15}$ independently represent a hydrogen atom, a halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, or nitro, or the $R^{11}$ through $R^{15}$ are linked to an adjacent substituent via (C3-C12)alkylene or (C3-C12)alkenylene with or without a fused ring to form an alicyclic ring and a monocyclic or polycyclic aromatic ring; and the alkyl, aryl, cycloalkyl, aralkyl, alkoxy, alkylsiloxy, arylsiloxy, alkylamino, arylamino, alkylthio, and arylthio of $R^1$ through $R^4$, $R^{11}$ through $R^{15}$, and $X^1$ and $X^2$; a ring formed by linking $R^1$ through $R^4$ or $R^{11}$ through $R^{15}$ to an adjacent substituent via alkylene or alkenylene; and the aryl or heteroaryl of $Ar^1$ may be further substituted with one or more selected from a halogen atom, (C1-C20)alkyl, (C3-C20)cycloalkyl, (C6-C30) aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, nitro, and hydroxy.

Meanwhile, in order to act, the transition metal catalyst of Chemical Formula 1 is used in combination with a co-catalyst. The co-catalyst can be an aluminum compound, a boron compound, or a mixture thereof. The co-catalyst acts as a counterion (i.e., anion) which has a weak bonding force while cationizing the central metal by extracting the ligand X from the transition metal compound. The aluminum compound can be an organic aluminum compound. Here, the organic aluminum compound is used to remove a slight amounts of polar substances acting as catalyst poison in a reaction solvent, but can act as an alkylating agent when ligand X is halogen.

The boron compound which can be used as co-catalyst, as shown in U.S. Pat. No. 5,198,401, may be selected from compounds represented by Chemical Formula 2, Chemical Formula 3, or Chemical Formula 4 below.

$B(R^{31})_3$ [Chemical Formula 2]

$[R^{32}]^+[B(R^{31})_4]^-$ [Chemical Formula 3]

$[(R^{33})_qZH]^+[B(R^{31})_4]^-$ [Chemical Formula 4]

In Chemical Formulas 2 through 4, B is a boron atom; $R^{31}$ is phenyl or phenyloxy, and the phenyl or phenyloxy may be further substituted with 3 to 5 substituents selected from a fluorine atom, (C1-C20)alkyl substituted or unsubstituted with a fluorine atom, or (C1-C20)alkoxy substituted or unsubstituted with a fluorine atom; $R^{32}$ represents (C5-C7) cycloalkyl radical or (C1-C20)alkyl(C6-C20)aryl radical, (C6-C30)ar(C1-C20)alkyl radical, for example, triphenylmethyl radical; Z represents a nitrogen or phosphorus atom; $R^{33}$ represents a (C1-C20)alkyl radical, or an anilinium radical substituted with two (C1-C4)alkyl groups together with a nitrogen atom; and q represents an integer of 2 or 3.

In addition, a mole ratio of the central metal M to a boron atom is preferably 1:0.1 to 1:50, and more preferably 1:0.5 to 1:15.

The aluminum compound used in the present invention may be an aluminoxane compound selected from Chemical Formula 5 and Chemical Formula 6, an organic aluminum compound of Chemical Formula 7, or an organic aluminum hydrocarbyloxide compound selected from Chemical Formula 8 and Chemical Formula 9.

$(-Al(R^{41})-O-)_m$ [Chemical Formula 5]

$(R^{41})_2Al-(-O(R^{41})-)_p-(R^{41})_2$ [Chemical Formula 6]

$(R^{42})_rAl(E)_{3-r}$ [Chemical Formula 7]

$(R^{43})_2AlOR^{44}$ [Chemical Formula 8]

$R^{43}Al(OR^{44})_2$ [Chemical Formula 9]

In Chemical Formulas 5 through 9, $R^{41}$, $R^{42}$, and $R^{43}$ independently represent a linear or non-linear (C1-C20)alkyl; m and p independently represent an integer of 5 to 20; E represents a hydrogen atom or a halogen atom; r represents an integer of 1 to 3; $R^{44}$ may be selected from a(C1-C20)alkyl and a(C6-C30)aryl.

In addition, a mole ratio of the central metal M to an aluminum atom is preferably 1:0.1:1 to 1:50:2,000, and more preferably 1:0.5:5 to 1:15:1,000.

In addition, a mole ratio of the central metal M, a boron atom, and an aluminum atom is preferably 1:0.1 to 50:1 to 1,000, and more preferably 1:0.5 to 15:5 to 500.

The present invention provides a process for preparing an ethylene copolymer obtained by polymerization of ethylene and one or more (C3~C18) α-olefin comonomers in the presence of a catalyst composition including a transition metal catalyst of Chemical Formula 1 represented in the above catalyst, within one reactor.

The ethylene copolymer of the present invention may be manufactured at a reaction temperature of 80 to 220° C. and a reaction pressure of 20 to 500 atm.

The polymerization may be performed in the presence of the catalyst or the catalyst composition, at a reaction temperature of 80 to 220° C., and specifically 90 to 180° C., and at a reaction pressure of 20 to 500 atm, and specifically, 30 to 200 atm. If the reaction temperature is below 80° C., reactants are precipitated or are not smoothly dispersed and the reaction does not occur, thereby making it difficult to generate a polymer. If the reaction temperature is above 220° C., it is impossible to prepare a polymer having a predesigned molecular weight. It is also difficult to prepare a polymer having a requested molecular weight even when the reaction pressure deviates from the above range.

Meanwhile, the aspect of the present invention is to control physical properties of the ethylene copolymer having a uniform molecular weight and co-monomer distribution in a unimodal by regulating process conditions, such as the amount of ethylene and the amount of hydrogen inputted into the reaction, conversion rate, and the like. The copolymer may be designed to have a narrow molecular weight distribution and co-monomer distribution due to the characteristics of the transition metal catalyst.

Figure 1:
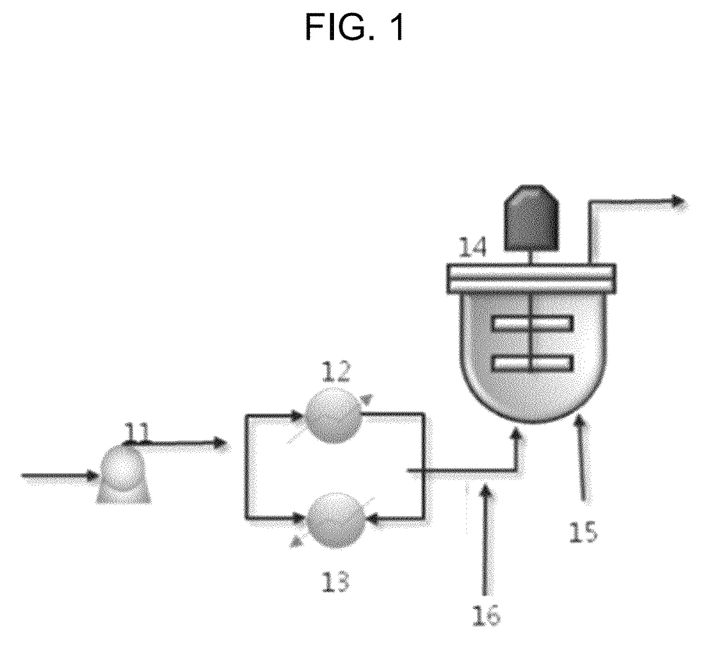
FIG. 1 is a schematic view of a reactor according to a preferred embodiment of the present invention.

In the reaction, FIG. 1 is a schematic view of a reactor according to a preferred embodiment of the present invention. Referring to FIG. 1, a reactor of the present invention includes a reactor feed pump 11, a reactor feed cooler 12, a reactor feed heater 13, a reactor 14, a reactor catalyst feed 15, and a hydrogen feed 16.

In the reaction of the present invention, reactants except catalyst are passed through a temperature control system consisting of a reactor feed cooler 12 and a reactor feed heater 13, by the reactor feed pump 11. This feed is fed into the reactor 14. The catalyst is fed into the reactor 14 through the reactor catalyst feed 15, and the hydrogen is fed into the reactor 14 through the hydrogen feed 16. Then, a polymerization reaction is performed. The entire reactor system needs to be designed and controlled, considering an ethylene conversion rate and activity of the catalyst in the reaction.

In the reaction of the present invention, ethylene and at least one (C3-C18) α-olefin comonomer can have 60 to 99 wt % of ethylene and 1 to 40 wt % of α-olefin comonomer. If the content of the ethylene in the ethylene copolymer is below 60 wt %, the content of the ethylene is too low, and the characteristics of the ethylene can not be exhibited, resulting in a deterioration in the physical properties of the ethylene copolymer. If the content of the ethylene in the copolymer is above 99 wt %, the effects of the copolymer are lowered.

In the reaction, the (C3-C18) α-olefin comonomer may be propylene, 1-butene, 1-pentene, 4-methyl-1-pentene, 1-hexene, 1-octene, 1-decene, 1-dodecene, and a mixture thereof, and among them, 1-butene, 1-hexene, 1-octene, and 1-decene are preferable.

In the reaction, a preferable organic solvent used in polymerization is C3-C20 hydrocarbon, and specific examples thereof may include butane, isobutane, pentane, hexane, heptane, octane, isooctane, nonane, decane, dodecane, cyclohexane, methylcyclohexane, benzene, toluene, xylene, and the like.

The ethylene copolymer prepared by the process of the present invention may have an MI of 3 to 50 g/10 min, and a density of 0.900 to 0.960 g/cm$^3$.

The copolymer prepared by the reaction has a melt index (MI) of 3 to 50 g/10 min, as measured by using MI measurement methods described in ASTM D 2839. If the MI of the polymer prepared by the reaction is below 3 g/10 min, the polymer has high viscosity, and thus processability thereof may be deteriorated. If the MI of the polymer is above 50 g/10 min, the physical properties of the ethylene copolymer, such as impact resistance and the like, may be deteriorated due to the low molecular weight of the copolymer. In addition, the copolymer obtained by the reaction may have a density of 0.900 to 0.960 g/cm$^3$. If the density of the polymer is below 0.900 g/cm$^3$, the physical properties of the copolymer may be deteriorated when the copolymer is molded into an injection molded product. If the density of the copolymer is above 0.960 g/cm$^3$, the copolymer becomes excessively stiff and thus can not be applied in an injection molded product. As for the copolymer prepared by the reaction, a transition metal catalyst having a single site, rather than a Ziegler-Natta catalyst exhibiting non-uniform copolymer distribution in a polymer chain, is used to polymerize a resin having an uniform copolymer distribution in the polymer chain, resulting in a final resin having improved physical properties.

The ethylene copolymer prepared by the method of the present invention can include an ethylene copolymer having a density of 0.905 to 0.950 g/cm$^3$, in a linear low density polyethylene (LLDPE), or an ethylene copolymer, of which a density is 0.910 g/cm$^3$ to 0.940 g/cm$^3$ in a linear low density polyethylene (LLDPE).

The ethylene copolymer prepared by the above preparation method may have a molecular weight distribution index ($M_w/M_n$) of 1.8 to 30. Therefore, the molecular weight distribution index (a mass average molecular weight divided by a number average molecular weight) of the ethylene copolymer prepared through the process and the catalyst of the present invention is controlled to be 1.8 to 30, thereby improving processability and physical properties of the ethylene copolymer.

In the present invention, ethylene and (C3-C18) α-olefin comonomer to be introduced to the reaction are dissolved in a solvent before they are fed into the reactor. Here, ethylene, comonomer, and solvent are subjected to a purification process before they are mixed with and dissolved in the solvent, to remove moisture, oxygen, carbon monoxide, and other metal impurities, which may potentially be a poison to the catalyst. Molecular sieve, activated aluminum, silicagel, or the like may be used as materials used in this purification process as known in the art.

In addition, raw materials to be introduced to the reaction are cooled or heated while passing through a heat exchange process, before they are fed into the reactor, thereby controlling the temperature of the reactor. Therefore, temperature control of the reactor is performed by an adiabatic reactor process without heat exchange through walls of the reactor, and the reaction heat is controlled to change temperatures of the solvent and the monomer fed into the reactor, and thus controls the temperature within the reactor.

Ethylene, comonomer, catalyst, solvent, and the like may be additively supplied after the reaction, and this supply is controlled under a predetermined temperature, passing through a heat exchange process. In general, the catalyst is supplied independently from other raw materials when the catalyst is fed in each step. Here, the catalyst is prepared such that it is mixed with the solvent or dissolved in the solvent in advance.

Meanwhile, a retention time at the reaction is determined by predesigned volume and production per unit time in each step. An operating condition needs to be maintained such that materials can be homogeneous through appropriate stirring in each reaction, and the finally prepared ethylene polymer or ethylene copolymer is obtained through an appropriate solvent removal process.

Therefore, the ethylene copolymer prepared through the reaction is used to obtain ethylene copolymer molded products, as injection products, particularly food containers, refrigerating containers, pipes, blow molded products, rotation molded products, sheet products, and compound products.

According to the present invention, an ethylene copolymer having a molecular weight distribution in a unimodal can be prepared through polymerization of ethylene and (C3~C18) α-olefin comonomer, thereby maintaining impact resistance and improving hygienic property.

Furthermore, an ethylene copolymer having both excellent mechanical properties, such as impact resistance and flexural modulus, and excellent hygienic property can be prepared by controlling density of the polyethylene resin. Therefore, the present invention can be applied to various uses, particularly to manufacture of injection products, such as food containers, refrigerating containers, and the like, through control of these physical properties.

DESCRIPTION OF DRAWINGS

The above and other objects, features and advantages of the present invention will become apparent from the following description of preferred embodiments given in conjunction with the accompanying drawings, in which.

| [Detailed Description of Main Elements] | |
|---|---|
| 11: REACTOR FEED PUMP | 12: REACTOR FEED COOLER |
| 13: REACTOR FEED HEATER | 14: REACTOR |
| 15: REACTOR CATALYST FEED | 16: HYDROGEN FEED |

DETAILED DESCRIPTION OF THE INVENTION

Hereinafter, the present invention will be understood and appreciated more fully from the following examples, and the examples are for illustrating the present invention and not for limiting the present invention.

Unless stated specifically, all ligand and catalyst synthesis experiments were performed by using standard Schlenk or glove-box techniques under the nitrogen ambiance, and the organic solvent used in the reaction was subjected to reflux in the presence of sodium metal and benzophenone, to remove moisture, and then distilled shortly before use. $^1$H-NMR analysis of the synthesized ligand and catalyst was performed at room temperature by using Varian Mercury 300 MHz spectrometer.

Cyclohexane as a polymerizing solvent was sequentially passed through a column filled with Q-5 catalyst (BASF Company), silica gel, and active alumina, and then bubbled by using high-purity nitrogen, thereby sufficiently removing moisture, oxygen, and other catalyst poison materials, before use.

The polymerized polymer was manufactured into an injection container by using injection molding machine, and the injection container was analyzed by the method explained as below.

1. Melt Index (MI)

Measurement was performed in accordance with ASTM D 1238.

2. Density

Measurement was performed using a density gradient column in accordance with ASTM D 1505.

3. Rockwell Hardness analysis (R-Scale)

Measurement was performed in accordance with ASTM D 785.

4. Flexural modulus

Measurement was performed in accordance with ASTM D 790.

5. Vicat Softening Temperature

Measurement was performed in accordance with ASTM D 1525.

6. Tensile strength

Measurement was performed in accordance with ASTM D 638.

7. Extract content

The extract content was determined from results obtained by temperature rising elution fractionation (TREF) analysis according to measurement of elution fraction. The TREF analysis was conducted using 1,2,4-trichlorobenzene as the solvent. The extract content was determined as the fraction of the peak elution fraction eluted at 35° C. for 10 minutes based on the total crystallization peak.

8. Shrinkage rate

Measurement was performed in accordance with ASTM D 2732.

PREPARATION EXAMPLE 1

Synthesis of bis(2-phenylphenoxy)(pentamethylcyclopentadienyl)titanium (IV) chloride 2-Phenylphenol (1.72 g, 10.1 mmol, Aldrich 99%) was putted into a dried flask, and dissolved in 40 mL of toluene, followed by stirring while the temperature was lowered to 0° C. N-butyl lithium (4.8 mL, 2.5 M of hexane solution, Aldrich) was slowly added dropwise to the mixture. After completion of addition, the temperature was maintained for 1 hour, and then raised to room temperature, followed by stirring for 12 hours. The temperature of this mixture was lowered to 0° C., and then pentamethylcyclopentadienyl titanium trichloride (1.64 g, 5.5 mmol) was dissolved in 10 mL of toluene and slowly added dropwise thereto. After completion of addition, the temperature was maintained for 1 hour, and then raised to room temperature, followed by stirring for 1 hour. The temperature of the reactor was raised to 90° C., and then reacted for 12 hours. The mixture thus obtained was filtered, followed by removal of volatile materials, recrystallization with a mixture solvent of toluene and hexane at −35° C., thereby obtaining orange solids 2.3 g.

Yield: 75%, $^1$H-NMR(C6D6) δ=1.54 (s, 15H), 6.74-7.16 (m, 9H) ppm

Mass (APCI mode, m/z): 558

Experiments relating to all examples were performed by using a continuous solution polymerization process as mentioned below.

EXAMPLES 1 to 6

Bis(2-phenylphenoxy)(pentamethylcyclopentadienyl)titanium (IV) chloride synthesized in Preparation example 1 was used as a single site catalyst, that is, a transition metal catalyst. The amount of catalyst used is shown in Table 1. Ti represents a single site catalyst, Al represents triisobutylaluminum as a co-catalyst, and B represents triphenylmethylinium tetrakispentafluorophenylborate. Respective catalysts were dissolved in xylene at concentrations of 0.2 g/L, 5.0 g/L, 1.5 g/L, and then fed into the reactor. Polymerization was performed by using 1-octene as comonomer to be fed into the reactor. The conversion rate in the reactor could be anticipated through the reaction conditions and temperature gradient in the reactor. Also, in the case of the single-site catalyst, the molecular weight of the polymer in the reactor was controlled as a function of the reactor temperature and 1-octene contents, and the reaction conditions are shown in Table 1.

The ethylene copolymers used in respective examples were prepared to have various density structures through the same catalyst system and process. The final ethylene copolymers had an MI of 3 to 50 g/10 min, which were polymerized to have the similar molecular weight, and the conditions thereof are shown in Table 1. The prepared ethylene copolymer was manufactured into injection specimens of 3 mm, ASTM standard size, by using 150-ton injection molding machine (Dongshin Hydraulics Company), and physical properties thereof were measured. The measurement results were tabulated in Table 3.

COMPARATIVE EXAMPLE 1

Measurement was performed by the same method as Example 1, except that CA100 Grade, which is commercial product of SK Energy Company, was used instead of the ethylene copolymer, and 1-butene was used as the comonomer, instead of 1-octene. The physical properties of the polymer were tabulated in Table 2. The ethylene copolymer was manufactured into an injection specimen of 3 mm, ASTM standard size, by using 150-ton injection molding machine (Dongshin Hydraulics Company), and physical properties thereof were measured. The measurement results were tabulated in Table 3.

COMPARATIVE EXAMPLE 2

Measurement was performed by the same method as Example 1, except that CA119 Grade, which is commercial product of SK Energy Company, was used instead of the ethylene copolymer, and 1-butene was used as the comonomer, instead of 1-octene. The physical properties of the polymer were tabulated in Table 2. The ethylene copolymer was manufactured into an injection specimen of 3 mm, ASTM standard size, by using 150-ton injection molding machine (Dongshin Hydraulics Company), and physical properties thereof were measured. The measurement results were tabulated in Table 3.

COMPARATIVE EXAMPLE 3

Measurement was performed by the same method as Example 1, except that JL210 Grade, which is commercial product of SK Energy Company, was used instead of the ethylene copolymer, and 1-butene was used as the comonomer, instead of 1-octene. The physical properties of the polymer were tabulated in Table 2. The ethylene copolymer was manufactured into an injection specimen of 3 mm, ASTM standard size, by using 150-ton injection molding machine (Dongshin Hydraulics Company), and physical properties thereof were measured. The measurement results were tabulated in Table 3.

COMPARATIVE EXAMPLE 4

Measurement was performed by the same method as Example 1, except that CA100P Grade, which is independently prepared by SK Energy Company, was used instead of the ethylene copolymer, and 1-butene was used as the comonomer, instead of 1-octene. The physical properties of the polymer were tabulated in Table 2. The ethylene copolymer was manufactured into an injection specimen of 3 mm, ASTM standard size, by using 150-ton injection molding machine (Dongshin Hydraulics Company), and physical properties thereof were measured. The measurement results were tabulated in Table 3.

COMPARATIVE EXAMPLE 5

Measurement was performed by the same method as Example 1, except that CA119P Grade, which is independently prepared by SK Energy Company, was used instead of the ethylene copolymer, and 1-butene was used as the comonomer, instead of 1-octene. The physical properties of the polymer were tabulated in Table 2. The ethylene copolymer was manufactured into an injection specimen of 3 mm, ASTM standard size, by using 150-ton injection molding machine (Dongshin Hydraulics Company), and physical properties thereof were measured. The measurement results were tabulated in Table 3.

COMPARATIVE EXAMPLE 6

Measurement was performed by the same method as Example 1, except that JL210P Grade, which is independently prepared by SK Energy Company, was used instead of the ethylene copolymer, and 1-butene was used as the comonomer, instead of 1-octene. The physical properties of the polymer were tabulated in Table 2. The ethylene copolymer was manufactured into an injection specimen of 3 mm, ASTM standard size, by using 150-ton injection molding machine (Dongshin Hydraulics Company), and physical properties thereof were measured. The measurement results were tabulated in Table 3.

TABLE 1

|  |  | Example 1 | Example 2 | Example 3 | Example 4 | Example 5 | Example 6 |
|---|---|---|---|---|---|---|---|
| Total solution flow rate(kg/h) |  | 10.9 | 10.9 | 10.9 | 10.9 | 10.9 | 10.9 |
| Feed ratio of 1-octene to ethylene | Reactor | 0.24 | 0.22 | 0.14 | 0.13 | 0.07 | 0.06 |
| Ti feed amount (μmol/kg) | Reactor | 2.2 | 2.3 | 4.9 | 5.1 | 6.7 | 6.9 |
| Al/Ti ratio |  | 60 | 60 | 60 | 60 | 60 | 60 |
| B/Ti ratio |  | 3 | 3 | 3 | 3 | 3 | 3 |
| Reactor hydrogen feed amount(ppm) |  | 30 | 33 | 30 | 34 | 52 | 55 |
| Reaction temperature | Reactor | 153 | 155 | 157 | 158 | 161 | 163 |
| Final ethylene copolymer | MI (g/10 min) | 23 | 27 | 21 | 25 | 17 | 18 |
| Final ethylene copolymer | Density (g/cm$^3$) | 0.915 | 0.918 | 0.925 | 0.928 | 0.932 | 0.938 |
| GPC of final ethylene copolymer | Number average molecular weight | 21,300 | 20,300 | 24,200 | 21,400 | 28,500 | 25,700 |
| GPC of final ethylene copolymer | Weight average molecular weight | 45,900 | 40,100 | 49,800 | 42,500 | 57,800 | 56,700 |
| GPC of final ethylene copolymer | Molecular weight distribution index | 2.15 | 1.98 | 2.06 | 1.99 | 2.03 | 2.21 |

Ti: bis(2-phenylphenoxy) (pentamethylcyclopentadienyl)titanium (IV) chloride in single site catalyst
Al: triisobutylaluminum as a co-catalyst
B: triphenylmethylinium tetrakispentafluorophenyl borate as a co-catalyst ASTM standard size, by using 150-ton injection molding

TABLE 2

|  |  | Comparative example 1 | Comparative example 2 | Comparative example 3 | Comparative example 4 | Comparative example 5 | Comparative example 6 |
|---|---|---|---|---|---|---|---|
| Final ethylene copolymer | MI (g/10 min) | 7 | 12 | 20 | 18 | 23 | 20 |
| Final ethylene copolymer | Density (g/cm$^3$) | 0.919 | 0.921 | 0.924 | 0.926 | 0.932 | 0.936 |
| GPC of final ethylene | Number average molecular | 21,500 | 22,000 | 21,800 | 20,800 | 20,200 | 22,300 |

TABLE 2-continued

|  |  | Comparative example 1 | Comparative example 2 | Comparative example 3 | Comparative example 4 | Comparative example 5 | Comparative example 6 |
|---|---|---|---|---|---|---|---|
| copolymer GPC of final ethylene copolymer | weight Weight average molecular weight | 74,700 | 62,700 | 54,800 | 57,700 | 47,500 | 53,100 |
| GPC of final ethylene copolymer | Molecular weight distribution index | 3.47 | 2.85 | 2.51 | 2.77 | 2.35 | 2.38 |

TABLE 3

| | Physical properties of ethylene copolymer Extract content (wt %) | Physical properties of injection specimen ||||| 
|---|---|---|---|---|---|---|
| | | Tensile strength (kg/cm$^2$) | Rockwell hardness (R-Scale) | Flexural modulus (kg/cm$^2$) | Vicat Softening Temperature (° C.) | Shrinkage rate (1/1000) |
| Example 1 | 1.7 | 83.2 | −17.5 | 1435 | 88.6 | 17.6 |
| Example 2 | 1.6 | 87.7 | −10.1 | 1689 | 89.7 | 17.6 |
| Example 3 | 0.6 | 105.5 | −15.8 | 2523 | 100.2 | 18.1 |
| Example 4 | 0.5 | 121.8 | −10.7 | 4300 | 107.8 | 18.3 |
| Example 5 | 0.2 | 143.1 | −9.1 | 5950 | 113.5 | 18.6 |
| Example 6 | 0.1 | 161.7 | −5.9 | 6783 | 118.3 | 18.2 |
| Comparative example 1 | 12.3 | 81.1 | −39.5 | 1630 | 88.0 | 18.3 |
| Comparative example 2 | 10.4 | 87.8 | −29.7 | 1895 | 85.2 | 18.6 |
| Comparative example 3 | 8.6 | 93.4 | −32.3 | 2197 | 88.6 | 18.6 |
| Comparative example 4 | 7.0 | 101.5 | −30.2 | 4710 | 97.3 | 19.1 |
| Comparative example 5 | 3.3 | 131.3 | −21.1 | 5776 | 109.0 | 18.7 |
| Comparative example 6 | 1.9 | 145.5 | −17.7 | 6837 | 111.7 | 18.6 |

Tables 1 and 2 show polymerization conditions of Examples 1 to 6 and Comparative examples 1 to 6 and physical properties of the polymers according to respective conditions. Table 3 shows physical properties of the polymers and injection specimens manufactured in Examples 1 to 6 and Comparative examples 1 to 6. As shown in Table 3, it can be seen that almost all physical properties were improved or maintained, in spite of similar MI values or densities. It can be confirmed that Examples 1 to 6 according to the present invention had remarkably low values in view of the extract content, and thus, hygienic property was improved.

Figure 2:
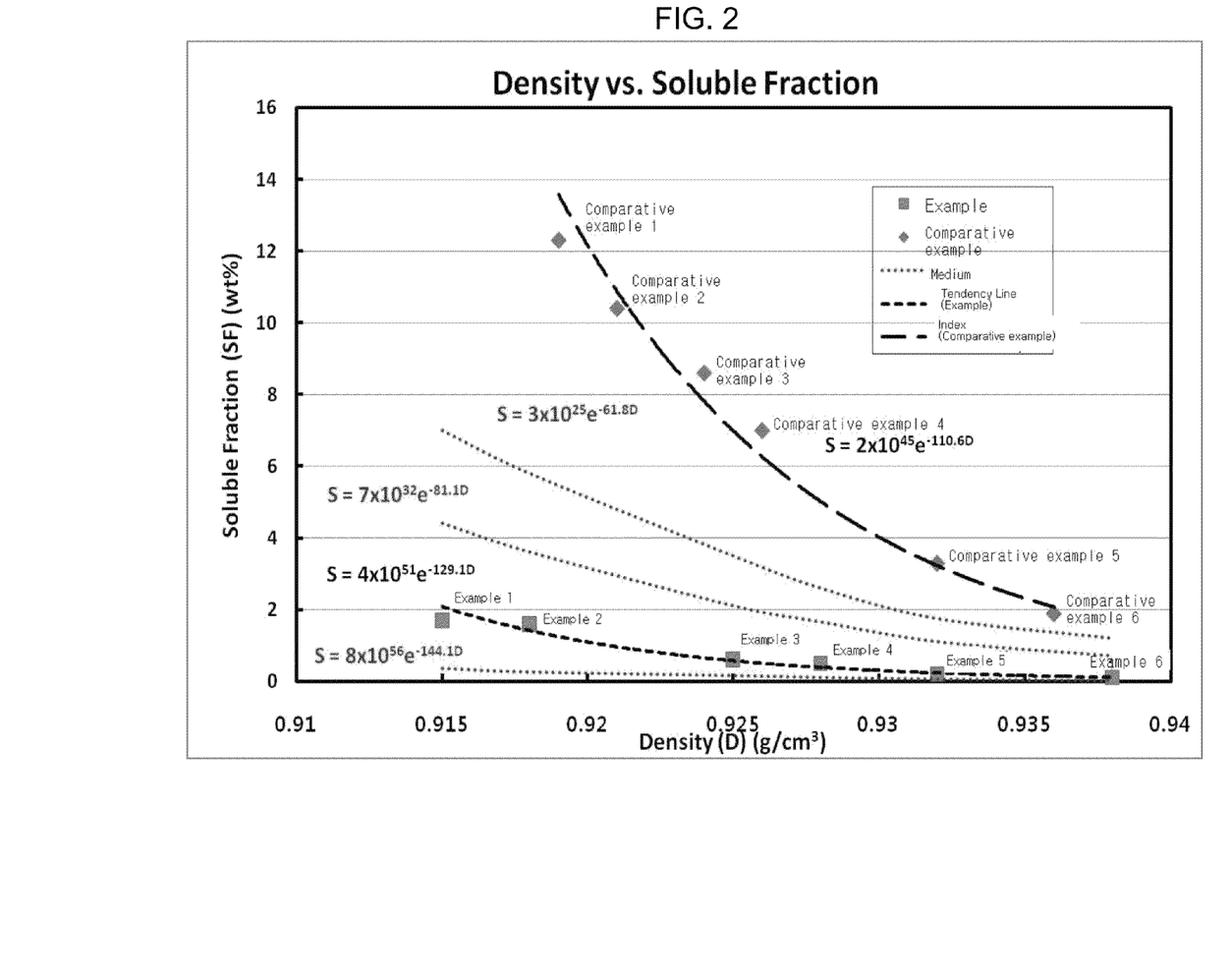
FIG. 2 is a graph with respect to extract contents according to a preferred embodiments of the present invention.

Also, as shown in FIG. 2, it can be confirmed that results of Examples 1 to 6 were 10 times lower than results of Comparative examples 1 to 6 in view of extract content. It can be confirmed that the polymers obtained through the examples according to the present invention had extract contents of 0.1 to 1.8 wt %, which indicates excellent hygiene property. This fact can emerge as a superior advantage for use in injection products, particularly food containers, refrigerating containers, or the like.

Furthermore, the polymers of Examples 1 to 6 had less warpage than the polymers of Comparative examples 1 to 6, and this fact can emerge as a superior advantage for use in injection products.

The foregoing present invention is not limited to the foregoing examples and the accompanying drawings. It will be apparent to those skilled in the art that various replacements, modifications and changes may be made without departing from the general technical knowledge of the invention.

What is claimed is:

1. An ethylene copolymer obtained by polymerization of ethylene and a (C3-C18) α-olefin co-monomer, the ethylene copolymer being injection-moldable, wherein the ethylene copolymer has a density of 0.91 to 0.94 g/cm$^3$ and a melt index (MI) of 3 to 50 g/10 min, a molecular weight distribution index 1.98 to 2.21 as measured by mass average molecular weight divided by number average molecular weight, and satisfies Formulas 1 and 2 below:

$$S \geq (8 \times 10^{56}) \times e^{-144.1D} \quad \text{[Formula 1]}$$

$$S \leq (3 \times 10^{25}) \times e^{-61.8D} \quad \text{[Formula 2]}$$

in Formulas 1 and 2, S (wt %) represents an extract content of the ethylene copolymer at 35° C. after 10 minutes as measured by temperature rising elution fractionation analysis using 1,2,4-trichlorobenzene as a solvent, and D (g/cm$^3$) represents a density of the ethylene copolymer.

2. The ethylene copolymer of claim 1, wherein the ethylene copolymer satisfies Formula 1 as defined in claim 1 and Formula 3 below:

$$S \leq (7 \times 10^{32}) \times e^{-81.1D} \quad \text{[Formula 3]}$$

in Formula 3, S (wt %) represents an extract content of the ethylene copolymer at 35° C. after 10 minutes as measured by themperature rising elution fractionation analysis using 1,2,4-trichlorobenzene as a solvent, and D (g/cm³) represents a density of the ethylene copolymer.

3. The ethylene copolymer of claim 1, wherein the extract content (S) of the ethylene copolymer is 1.8 wt % or lower.

4. The ethylene copolymer of claim 1, wherein the extract content (S) of the ethylene copolymer is 0.1 to 1.8 wt %.

5. The ethylene copolymer of claim 1, wherein the (C3~C18) α-olefin comonomer is selected from propylene, 1-butene, 1-pentene, 4-methyl-1-pentene, 1-hexene, 1-octene, 1-decene, 1-dodecene, and a mixture thereof.

6. The ethylene copolymer of claim 5, wherein the (C3~C18) α-olefin comonomer is contained in a content of 1 to 40 wt %.

7. The ethylene copolymer of claim 1, wherein the polymerization is conducted in the presence of a catalyst composition including a transition metal catalyst represented by Chemical Formula 1 below:

[Chemical Formula 1]

in Chemical Formula 1, M represents a group IV transition metal in a periodic table;

Cp is a cyclopentadienyl ring or a fused ring including a cyclopentadienyl ring, which may be η5-bonded to the central metal M, and the cyclopentadienyl ring or the fused ring including a cyclopentadienyl ring may be further substituted with one or more selected from (C1-C20)alkyl, (C6-C30)aryl, (C2-C20)alkenyl, and (C6-C30)ar(C1-C20)alkyl;

$R^1$ through $R^4$ independently represent a hydrogen atom, a halogen atom, (C1-C20)alkyl, (C3-C20)cycloalkyl, (C6-C30)aryl, (C6-C30)ar(C1-C10)alkyl, (C1-C20) alkoxy, (C3-C20)alkylsiloxy, (C6-C30)arylsiloxy, (C1-C20)alkylamino, (C6-C30)arylamino, (C1-C20)alkylthio, (C6-C30)arylthio, or nitro, or the $R^1$ through $R^4$ are linked to an adjacent substituent via (C3-C12)alkylene or (C3-C12)alkenylene with or without a fused ring to form an alicyclic ring and a monocyclic or polycyclic aromatic ring;

$Ar^1$ represents (C6-C30)aryl or (C3-C30)heteroaryl containing one or more selected from N, O, and S;

$X^1$ and $X^2$ independently represent a halogen atom, (C1-C20)alkyl, (C3-C20)cycloalkyl, (C6-C30)ar(C1-C20) alkyl, (C1-C20)alkoxy, (C3-C20)alkylsiloxy, (C6-C30) arylsiloxy, (C1-C20)alkylamino, (C6-C30)arylamino, (C1-C20)alkylthio, (C6-C30)arylthio, or $R^{11}$ through $R^{15}$ independently represent a hydrogen atom, a halogen atom, (C1-C20)alkyl, (C3-C20)cycloalkyl, (C6-C30)aryl, (C6-C30)ar(C1-C10)alkyl, (C1-C20) alkoxy, (C3-C20)alkylsiloxy, (C6-C30)arylsiloxy, (C1-C20)alkylamino, (C6-C30)arylamino, (C1-C20)alkylthio, (C6-C30)arylthio, or nitro, or the $R^{11}$ through $R^{15}$ are linked to an adjacent substituent via (C3-C12)alkylene or (C3-C12)alkenylene with or without a fused ring to form an alicyclic ring and a monocyclic or polycyclic aromatic ring; and the alkyl, aryl, cycloalkyl, aralkyl, alkoxy, alkylsiloxy, arylsiloxy, alkylamino, arylamino, alkylthio, and arylthio of $R^1$ through $R^4$, $R^{11}$ through $R^{15}$, and $X^1$ and $X^2$; a ring formed by linking $R^1$ through $R^4$ or $R^{11}$ through $R^{15}$ to an adjacent substituent via alkylene or alkenylene; and the aryl or heteroaryl of $Ar^1$ may be further substituted with one or more selected from a halogen atom, (C1-C20)alkyl, (C3-C20)cycloalkyl, (C6-C30)aryl, (C6-C30)ar(C1-C10)alkyl, (C1-C20) alkoxy, (C3-C20)alkylsiloxy, (C6-C30)arylsiloxy, (C1-C20)alkylamino, (C6-C30)arylamino, (C1-C20)alkylthio, (C6-C30)arylthio, nitro, and hydroxy.

8. An injection product manufactured from the ethylene copolymer of claim 1.

9. The injection product of claim 8, wherein the injection product is a food container.

10. The injection product of claim 8, wherein the injection product is a container for using in a refrigerator.

11. The injection product of claim 8, wherein the injection product is a pipe, a hollow molded product, a rotation molded product, or a sheet product.

* * * * *